July 16, 1968
G. E. WOLF
3,392,990
RETRACTABLE CAMPER BODY DOOR STEP
Filed Dec. 21, 1965
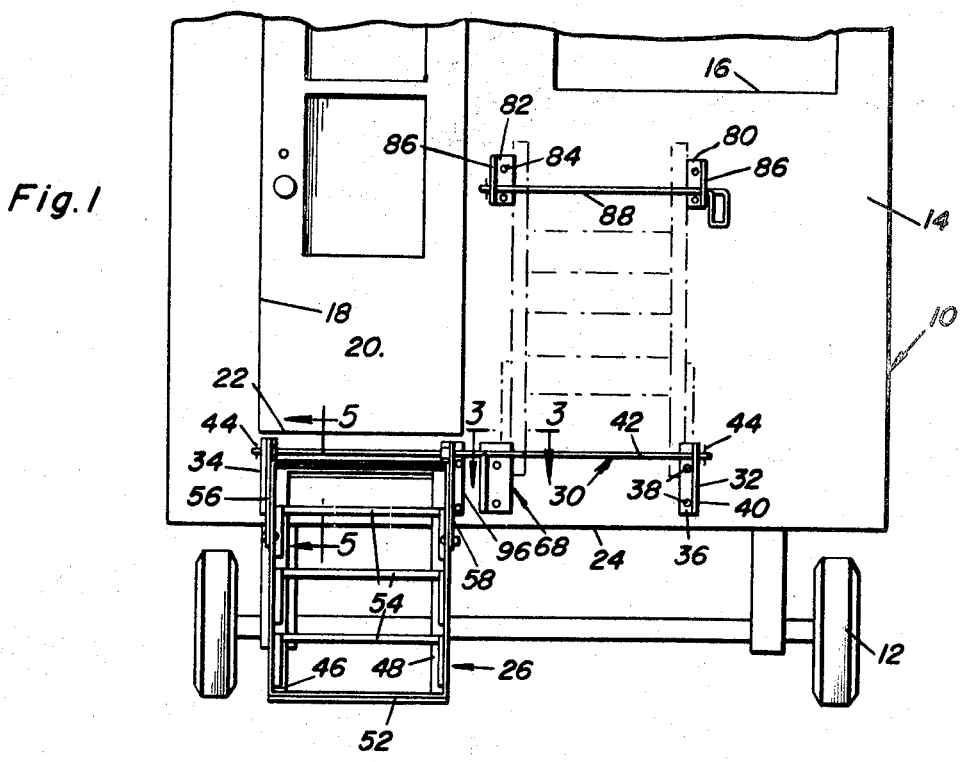
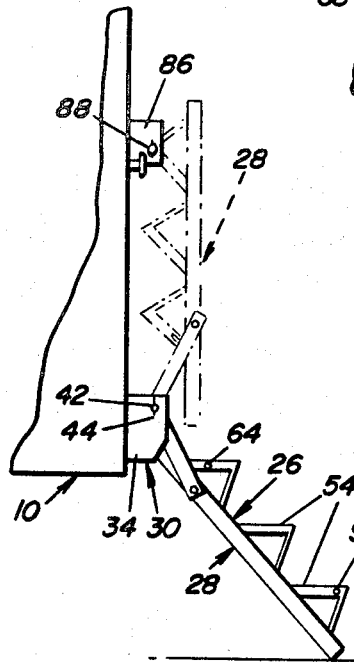
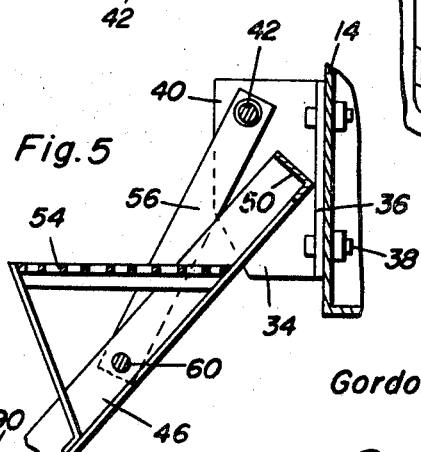
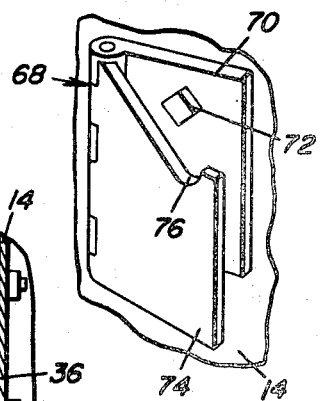
Gordon E. Wolf
INVENTOR.

United States Patent Office 3,392,990
Patented July 16, 1968

3,392,990
RETRACTABLE CAMPER BODY DOOR STEP
Gordon E. Wolf, Rte. 2, Box 263,
Lebanon, Oreg. 97355
Filed Dec. 21, 1965, Ser. No. 515,426
6 Claims. (Cl. 280—163)

ABSTRACT OF THE DISCLOSURE

An upstanding step construction supported at its upper end from a wall structure having a door opening therein for ascending and descending relative to the opening, the end of the step construction supported from the wall structure being slidable along the wall structure from a position in registry with the opening to a position disposed completely to one side of the opening and for pivotal movement of the step about an axis generally paralleling the wall structure and extending transversely of the end of the step supported from the wall structure, whereby the step may be operatively positioned in registry with the opening for ascending and descending relative to the latter and when not needed laterally shifted to one side of the opening and pivoted to and retained in an inverted inoperative position alongside the door opening.

---

This invention relates to a novel and useful retractable step construction and more specifically to a retractable step construction adapted to be utilized in conjunction with a camper body which conventionally includes an elevated door opening in one side wall thereof.

A camper body is generally thought of as a camping enclosure mounted on the load bed portion of a pickup truck and the rear wall of such camper bodies is usually provided with a door opening whose lower extremity is disposed adjacent the bottom of the load bed of the associated pickup truck, which load bed bottom is, of course, elevated considerably above the ground on which the associated pickup truck is supported.

Therefore, if easy access to the interior of a camper body is to be provided, it is necessary that some means be provided whereby a person wishing to gain access to the interior of the camper body may elevate himself to the level of the door opening formed in the rear wall of the camper body.

The retractable camper body door step of the instant invention is designed specifically with this main purpose in mind and is constructed in a manner whereby it may be readily shifted between an operative position inclined downwardly and away from the lower extremity of the door opening in the rear wall of the camper body and a raised inoperative position shifted to one side of the door opening.

The retractable camper body door step of the instant invention includes a horizontally elongated mounting assembly which is adapted to be secured to the rear wall of the camper body beneath the door opening formed therein and with the mounting assembly disposed beneath and projecting outwardly to one side of the door opening. An elongated step construction, either ladder-type or stair tread and riser-type, is pivotally secured adjacent its upper end to the mounting assembly for rotation about a horizontal axis extending transversely of the elongated step and extending longitudinally of the mounting assembly and is also slidably supported from the mounting assembly for movement longitudinally thereof from a position in vertical alignment with the associated door opening and a second position disposed to one side of the door opening, in which second position the elongated step may have its free lower end swung upwardly and toward the rear wall of the associated camper body in which the door opening is disposed so as to be shifted to an inoperative position disposed at one side of the door opening in a substantially vertical inverted position.

The main object of this invention is to provide a door step assembly for a camper body which may be readily shifted between operative and inoperative positions in relation to a door opening formed in a camper body rear wall with the step assembly vertically aligned with and inclined downwardly and outwardly away from the camper body door opening when the step assembly is in its operative position and with the step construction disposed in an inverted substantially vertically disposed position alongside the door opening when the step assembly is in its inoperative retracted position.

Another object of this invention is to provide a retractable door step for a camper body constructed in a manner whereby it may be readily secured to substantially all existing camper body constructions.

Still another object of this invention is to provide a retractable camper body door step which will be readily shiftable between the aforementioned operative and inoperative positions.

A final object of this invention to be specifically enumerated herein is to provide a retractable camper body door step which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary rear elevational view of a camping enclosure similar to those utilized on pickup trucks and on trailer frames whereby a mobile enclosure including ground engaging support wheels is provided, the camping enclosure construction having the retractable door step assembly of the instant invention operatively mounted thereon and illustrated in an operative position in solid lines and in a retracted inoperative position in phantom lines;

FIGURE 2 is a fragmentary side elevational view of the embodiment illustrated in FIGURE 1 and as seen from the left side of the latter;

FIGURE 3 is an enlarged fragmentary horizontal sectional view taken substantially upon the plane indicated by the section line 3—3 of FIGURE 1;

FIGURE 4 is a perspective view of a hinge-like structure adapted to provide intermittent support for the center portion of the portion of the horizontally elongated mounting assembly upon which the elongated step element of the instant invention is longitudinally slidable; and FIGURE 5 is an enlarged fragmentary vertical sectional view taken substantially upon the plane indicated by the section line 5—5 of FIGURE 1.

Referring now more specifically to the drawings, the numeral 10 generally designates a camper body enclosure assembly which for the purpose of simplicity of illustration is illustrated in FIGURE 1 of the drawings as including its own ground engaging support wheels 12. The assembly 10 includes a rear wall 14 having a window opening 16 and a door opening 18 formed therein. A door member 20 is swingably supported from the rear wall 14 for movement into and out of position closing the door opening 18 and it will be seen from FIGURE 1 of the drawings that the lower extremity 22 of the door opening 18 is spaced somewhat above the lower edge 24 of the rear wall 14. In addition, the lower edge 24 is spaced considerably above a horizontal plane passing through the lowermost extremities of the ground engaging support wheels 12 and therefore the lower extremity 22 of the door opening 18 is spaced appreciably above any surface upon which the ground engaging support wheels 12 rest.

The retractable door step assembly of the instant invention is generally referred to by the reference numeral 26 and includes a step member generally referred to by the reference numeral 28 and a horizontally elongated step member mounting assembly generally referred to by the reference numeral 30. The mounting assembly 30 includes a pair of L-shaped brackets 32 and 34 having transverse flange portions 36 secured to the rear wall 14 in any convenient manner such as by fasteners 38 and longitudinally extending apertured flanges 40 through which a guide rod 42 is secured by means of suitable removable fasteners 44. The rod 42 is spaced rearwardly of the rear wall 16 and spaced slightly below the lower extremity 22 of the door opening 18. Further, the rod 42 extends beneath the door opening 18 and includes a right end portion, as viewed in FIGURE 1, which projects to the right of the door opening a distance at least equal to the width of the door opening 18.

The step member 28 includes a pair of elongated and generally parallel opposite side members 46 and 48 which are in the form of angle irons and one pair of corresponding ends of the side members 46 and 48 are interconnected by means of a first transverse member 50 which is also in the form of an angle iron. In addition, the other pair of corresponding ends of the side members 46 are interconnected by means of a second transverse member 52 and a plurality of still further transverse members 54 extend between and interconnect the side members 46 and 48 intermediate their opposite ends at points spaced longitudinally therealong.

The step member 28 includes a pair of support arms 56 and 58 which are pivotally secured at one pair of corresponding ends to the corresponding side members of the step member 28 by means of pivot fasteners 60 passed through the side members 46 and 48 intermediate the top transverse member 54 and the transverse member 54 disposed immediately therebelow. The other pair of corresponding ends of the support arms 56 are rotatably and slidably journaled on the guide bar 42 for sliding movement between the brackets 32 and 34.

As can best be seen from FIGURE 2 of the drawings, the uppermost transverse member 54 includes a pair of opposite side abutments 64 which are engageable by the mid-portions of the corresponding support arms 56 to limit counterclockwise swinging movement of the side members 46 and 48 relative to the support arms 56 and 58 in a counterclockwise direction as seen in FIGURE 2 of the drawings.

The mounting assembly 30 also includes a support assembly generally referred to by the reference numeral 68 for supporting the guide rod 42 centrally intermediate its opposite ends and the support assembly 68 comprises a hinge-like construction including a first hinge leaf 70 which is secured to the rear wall 14 in any convenient manner such as by fasteners 72 and a second hinge leaf 74 which is swingable relative to the first leaf 70 and includes an upwardly opening seat 76 for seatingly receiving the centrally intermediate portion of the guide rod 42. Still further, the mounting assembly additionally includes a pair of upper support brackets 80 and 82 which are secured to the rear wall 16 by means of suitable fasteners 84 and which include apertured vertical flange portions extending longitudinally of the camper body enclosure assembly 10 designated by the reference numerals 86. A locking shaft 88 is removably receivable through the apertured vertical flanges 86 and may be positioned behind the step member 28 and may be passed through the flanges 86 and the apertures 90 formed in the opposite end portions of the lowermost transverse member 54 when the step member 28 is in the inverted position illustrated in phantom lines in FIGURES 1 and 2 of the drawings.

It will, of course, be noted that the transverse members 54 are in the form of tread members but it is to be noted that the transverse members 54 could also assume the form of ladder rungs and that the step member 28 could therefore also be similar to a short ladder.

Finally, the mounting assembly 30 includes an abutment plate 96 which is similar to the flange portions 36 of the brackets 32 and 34 and is adapted to have the corresponding end of the transverse member 50 abutted thereagainst when the step member 28 is in the solid line position illustrated in FIGURE 1 of the drawings.

In operation, when the step member 28 is in the position illustrated in solid lines in FIGURE 1 of the drawings, it is of course in its operative position and may be utilized by a person to ascend to and descend from the door opening 18. In this position, the transverse member 50 is abutted against the plate 98 and the horizontal flange portion 36 of the bracket 34. Then, when it is desired to shift the step member 28 from the operative position illustrated in solid lines in FIGURE 1 of the drawings to the inoperative phantom line position illustrated in FIGURE 1, the centrally intermediate portion of the guide bar 42 is pulled upwardly out of the seat 76 and the second leaf 74 is swung toward the dotted line position illustrated in FIGURE 3 of the drawings. Then, the lower end of the step member 28 may be swung upwardly so as to be moved from contact with the ground on which the wheels 12 rest and the step member 28 may be slid longitudinally of the rod 42 into abutting engagement with the bracket 32. Thereafter, the free lower end of the step member 28 may be swung upwardly and then forwardly so that the step member 28 is disposed in a substantially vertically disposed and inverted position such as that illustrated in phantom lines in FIGURES 1 and 2 of the drawings. Thereafter, the locking shaft or rod 88 may be withdrawn from the flanges 86 and then again passed through the flanges 86 and the apertures or bores 90 formed in the lowermost transverse member 54. Of course, the central portion of the guide bar 42 may then be again displaced slightly upwardly so as to enable the second leaf 74 to again be positioned in the solid line position illustrated in FIGURE 3 of the drawings before releasing the guide bar 42 and allowing it to move downwardly into seated engagement in the seat or notch 76. Of course, when it is desired to shift the step member 28 from the phantom line position illustrated in FIGURE 1 of the drawings to the operative solid line position of FIGURE 1, the above recited steps are substantially reversed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a wall structure having a door opening formed therein, a retractable door step for ascending and descending relative to said opening, said door step assembly comprising an elongated step, a horizontally elongated mounting assembly secured to said wall structure adjacent the lower portion of said opening with one end of said mounting assembly projecting beyond one side of said door opening a distance in excess of the width of said step measured along said mounting assembly, said step and said mounting assembly including coacting means pivotally securing one end of said step to said mounting assembly for pivotal movement of said step about an axis extending transversely of said step and generally paralleling said mounting assembly between a first upstanding inverted position and a second position with the upper end of the inverted step swung horizontally and downwardly from said wall structure, said coacting means also slidably securing said step to said mounting assembly for sliding movement of said step longitudinally of said mounting assembly between a position registered with said door opening and a position disposed completely to said one side of said opening.

2. The combination of claim 1 wherein said mounting assembly includes latch means supported from said wall structure at said one side of said door opening and engageable with the free end of said elongated step to releasably retain the latch in an inverted upstanding pivoted position disposed on said one side of said door opening.

3. The combination of claim 1 wherein said horizontally elongated mounting assembly comprises an elongated bar along and about which the upper end of said elongated step is freely, slidable and rotatable, respectively.

4. The combination of claim 3 wherein the upper end of said step includes a pair of spaced elongated and upstanding generally parallel supporting arms pivotally secured at their lower ends to opposite sides of said step for rotation about generally aligned axes extending transversely of said step and arm and generally paralleling said bar, the upper ends of said arms being slidably and rotatably mounted on said bar for movement longitudinally therealong and rotation about the longitudinal axis of said bar.

5. The combination of claim 1 wherein said horizontally elongated mounting assembly comprises an elongated bar along and about which the upper end of said elongated step is freely slidable and rotatable, respectively, said bar being supported at its opposite ends with said bar spaced outwardly of said wall structure, a support member for the central portion thereof intermediate its opposite ends, said support member including an elongated arm member pivotally secured at one end to said wall structure for rotation about an upstanding axis and including a free end portion swingable outwardly away from said wall structure in registry with and beneath said rod and including an upwardly facing abutment surface against which said bar is adapted to rest.

6. The combination of claim 5 wherein the upper end of said step includes a pair of spaced elongated and upstanding generally parallel supporting arms pivotally secured at their lower ends to opposite sides of said step for rotation about generally aligned axes extending transversely of said step and arms and generally paralleling said bar, the upper ends of said arms being slidably and rotatably mounted on said bar for movement longitudinally therealong and rotation about the longitudinal axis of said bar.

References Cited
UNITED STATES PATENTS

| | | | |
|---|---|---|---|
| 533,209 | 1/1895 | Coggeshall | 280—166 |
| 2,324,507 | 7/1943 | Johnson | 280—166 |

PHILIP GOODMAN, *Primary Examiner.*